July 28, 1925.  1,547,615

W. SCHAAKE

CURRENT COLLECTOR

Filed March 15, 1922

WITNESSES:
R. S. Harrison
A. Martin

INVENTOR
William Schaake
BY
Wesley S. Carr
ATTORNEY

Patented July 28, 1925.

1,547,615

UNITED STATES PATENT OFFICE.

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA.

CURRENT COLLECTOR.

Application filed March 15, 1922. Serial No. 543,973.

*To all whom it may concern:*

Be it known that I, WILLIAM SCHAAKE, a citizen of the United States, and a resident of Pittsburgh, in the county of Allegheny and State of Pennsylvania, have invented a new and useful Improvement in Current Collectors, of which the following is a specification.

My invention relates to current collectors and particularly to collectors for employment with trackless trolley vehicles.

In the operation of trackless trolley busses, it is sometimes found desirable to house them in ordinary trolley-car barns, as when the trolley bus serves as a feeder for the usual trolley line. In order to do this, it may be necessary to drive the bus for a distance along a single-conductor trolley line. It has been suggested that auxiliary collectors be provided to conduct current from a single trolley wire on trolley busses, especially those of the type wherein two conductors are mounted upon a single pole. This suggestion has arisen from the fact that neither of the two collectors, during normal operation of the bus, could properly co-operate with a single-line trolley wire.

My invention has for its object the provision of means whereby a trolley pole provided with two collectors may be employed for collecting current from a single trolley wire.

Another object of my invention is the provision of a simple and effective means for uninterruptedly conveying current past a swivel base, through a plurality of conductors that co-operate with two contact devices carried at the outer end of a trolley pole.

Figure 1:
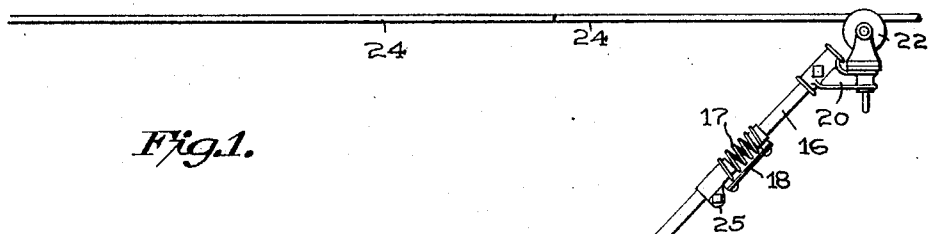
Figure 2:
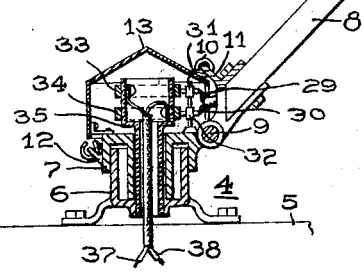
Figure 2:
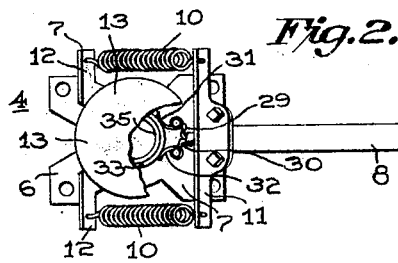
Figure 3:
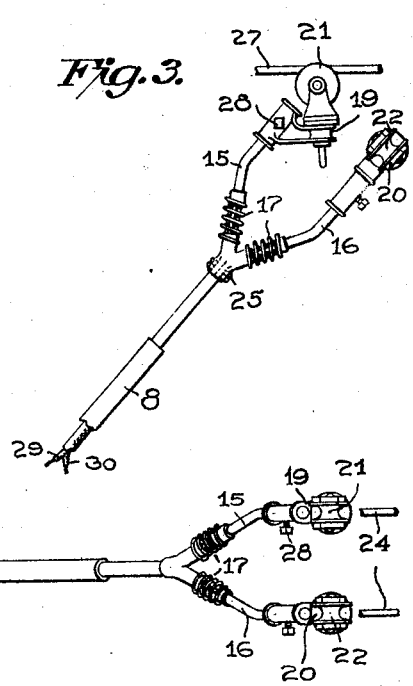

As shown in the accompanying drawings,

Figure 1 is a view, partially in side elevation and partially in section, of a trolley embodying my invention, Fig. 2 is a view thereof, partially in plan and partially in section, and Fig. 3 is a view showing the positions occupied by current collectors when employed in connection with a single trolley wire.

A base 4 of the usual swivel type, which is mounted upon the top 5 of a vehicle, comprises a fixed portion 6 and a rotatable portion 7. A pole 8 is pivoted at 9 to the member 7 and is normally biased upwardly by a pair of springs 10 that are secured, at their opposite ends, to a cross bar 11 carried by the pole 8 and lugs 12 that are secured to the swivel member 7. A hood 13 is provided for protecting the apparatus located therebeneath.

The pole 8, at its outer end, is provided with arms 15 and 16 that are supported from the pole by means of springs 17. A plate 18, either of yieldable material or having a slot at its outer end through which the securing bolt at that end extends, is provided for each of the springs 17, to support them against excessive deflection vertically.

The arms 15 and 16 are provided, at their outer ends, with swivel harps 19 and 20, respectively, and these harps serve to support trolley wheels 21 and 22 for co-operation with a pair of trolley wires 24.

The harp 20 is rigidly secured to its arm 16, but the harp 19 is rotatable about the longitudinal axis of its arm, as will be hereinafter described.

The arms 15 and 16, are clamped, at their inner ends, about the pole 8 by means of a bolt 25. By loosening the bolt 25, the arms 15 and 16 may be rotated from their normal longitudinally spaced positions into a vertical position, as indicated in Fig. 3. This operation will bring the trolley harp 19 into the same vertical plane as that occupied by the trolley pole 8 and in position to co-operate with a single trolley wire 27, as indicated in Fig. 3. A set-screw 28 is provided for adjusting the trolley harp 19 to upright position when the arms 15 and 16 have been swung from one position to another.

It will be understood that, with the ordinary form of two-collector trolley pole, if an effort were made to employ only one of the trolley wheels in connection with a single wire, that the tension on the pole would cause the other trolley wheel to project above the trolley wire and to cause interference with the cross wires and other line apparatus, besides throwing the trolley pole out of balance.

By means of my arrangement, the arms 15 and 16 and one of the harps may be adjusted so that the trolley pole will function effectively with a single trolley wire.

Conductors 29 and 30 extend from the trolley harps 19 and 20, respectively, to brush members 31 and 32, respectively, that are supported by the swivel member 7 of the trolley base 4. The brushes 31 and 32 engage collector rings 33 and 34, respectively, that are mounted upon an insulating member 35 which is fixedly supported in the base portion 6, these rings serving as terminals for a pair of conductors 37 and 38, that lead to electrical apparatus within the vehicle (not shown).

It will be seen that, by means of this arrangement, the trolley pole 8 may rotate freely about its base without interrupting the flow of current through the conducting members just described.

If desired, the harp 19 may be permitted to swivel freely about the outer end of the arm 15, as it would normally be maintained in operative postion, regardless of the disposition of the arms 15 and 16, by reason of the direction of the lines of force exerted thereupon when it is in contact with the trolley wire. It will be understood that other forms of contact devices than the wheels 21 and 22 may be employed.

Various other modifications may be made in detail and general arrangement without departing from the spirit and scope of the invention as defined in the accompanying claims.

I claim as my invention:

1. A current-collecting device comprising a trolley pole provided, at its outer end, with a pair of normally laterally spaced contact members, and means for permitting the adjustment of the said contact members into set positions wherein they occupy different horizontal planes.

2. A current-collecting device comprising a pair of normally laterally spaced contact members, a support therefor, and means for permitting the setting of one of the contact members in vertically spaced relation to the other of said contact members.

3. A current-collecting device comprising a trolley pole provided with a swiveled pole-head, a pair of normally laterally spaced contact devices carried by the said head, and means for locking the said head against rotative movement.

4. A current-collecting device comprising a trolley pole provided with a pole-head mounted for rotative movement about the longitudinal axis of the pole, a pair of normally laterally spaced contact devices carried by the said head, and means for locking the said head against rotative movement.

5. A current-colecting device comprising a trolley pole provided with a pair of laterally spaced contact devices mounted for rotative movement, as a unit, about the longitudinal axis of the pole, and an independent pivotal support disposed vertically for one of the contact devices.

6. A current-collecting device comprising a trolley pole, a pole-head therefor provided with a pair of laterally spaced arms and mounted for rotative movement, and a contact device carried by each of the said arms, one of the said devices being mounted for rotative movement about a vertically disposed pivot.

7. A current-collecting device comprising a trolley pole, a pole-head therefor provided with a pair of laterally spaced arms and mounted for rotative movement, a contact device carried by each of the said arms, one of the said devices being mounted for rotative movement about its supporting arm, means for locking the pole head at any desired position of rotative movement, and means for locking the last named contact device at any desired point in its path of rotative movement.

In testimony whereof, I have hereunto subscribed my name this 10th day of March, 1922.

WILLIAM SCHAAKE.